United States Patent
Shin et al.

(10) Patent No.: US 9,582,736 B2
(45) Date of Patent: Feb. 28, 2017

(54) APPARATUS AND METHOD FOR CLASSIFYING DATA AND SYSTEM FOR COLLECTING DATA

(71) Applicant: SAMSUNG SDS CO., LTD., Seoul (KR)

(72) Inventors: Dong Min Shin, Seoul (KR); Jae Young Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 447 days.

(21) Appl. No.: 14/141,794

(22) Filed: Dec. 27, 2013

(65) Prior Publication Data

US 2015/0120639 A1  Apr. 30, 2015

(30) Foreign Application Priority Data

Oct. 30, 2013 (KR) .................. 10-2013-0130180

(51) Int. Cl.
*G06K 9/62* (2006.01)
*G06N 99/00* (2010.01)

(52) U.S. Cl.
CPC ......... *G06K 9/6221* (2013.01); *G06N 99/005* (2013.01)

(58) Field of Classification Search
None
See application file for complete search history.

(56) References Cited

U.S. PATENT DOCUMENTS

| 6,460,035 B1* | 10/2002 | Siegwart | G06F 17/18 707/737 |
| 8,311,973 B1* | 11/2012 | Zadeh | G06N 7/02 706/62 |
| 2003/0065535 A1* | 4/2003 | Karlov | G06F 19/3431 705/2 |
| 2006/0111644 A1* | 5/2006 | Guttag | A61B 5/048 600/544 |
| 2010/0017354 A1* | 1/2010 | Chan | G01V 1/30 706/47 |
| 2010/0217593 A1* | 8/2010 | Shields | G10L 15/144 704/245 |

OTHER PUBLICATIONS

Aiazzi et al, Land Cover Classification of Urban and Sub-Urban Areas via Fuzzy Nearest-Mean Reclustering of SAR Features, 2003.*

* cited by examiner

*Primary Examiner* — Stanley K Hill
*Assistant Examiner* — Mikayla Chubb
(74) *Attorney, Agent, or Firm* — Sughrue Mion, PLLC

(57) ABSTRACT

Provided are an apparatus and method for classifying data and a system for collecting data. The method includes clustering vectors, each of which consists of at least one attribute value, for a plurality of pieces of target data including degrees of class membership and the vectors in view of the degrees of class membership, labeling the plurality of pieces of target data according to a result of the clustering, and generating a classification model using the labeled pieces of target data.

28 Claims, 4 Drawing Sheets

APPARATUS AND METHOD FOR CLASSIFYING DATA AND SYSTEM FOR COLLECTING DATA

CROSS-REFERENCE TO RELATED APPLICATION

This application claims priority to and the benefit of Republic of Korea Patent Application No. 10-2013-0130180 filed on Oct. 30, 2013, the disclosure of which is incorporated herein by reference in its entirety.

BACKGROUND

1. Technical Field

The present disclosure relates to data classification technology, and more particularly, to an apparatus and method for classifying data and a system for collecting data.

2. Discussion of Related Art

The label of data should be obvious so that the data can be classified. Thus, when the label of the data is not obvious and is merely represented by a degree of class membership, it is difficult to classify the data. For example, as shown in Table 1 below, when a degree of correlation between a fault of a server and performance data of the server is represented by a degree of class membership, it is difficult to determine whether to classify the performance data as abnormal (A) or normal (N).

TABLE 1

| Identifier | Degree of class membership | CPU usage rate | Memory usage rate | CPU waiting time |
|---|---|---|---|---|
| AAA | 30.55 | 70.10 | 4.5 | 430.1 |
| BBB | 79.11 | 4.32 | 97.12 | 96.3 |
| CCC | 5.15 | 18.07 | 3.2 | 4.2 |

Here, even when performance data is labeled based on a previously set value of a degree of class membership (e.g., a value of 60 or more is labeled as abnormal (A), and a value less than 60 is labeled as normal (N)), a result of labeling according to the degree of class membership has low reliability, and a classification result also has low reliability.

SUMMARY

The embodiments of the present disclosure are directed to providing an apparatus and method for classifying data having improved performance in classifying data, and a system for collecting data using the apparatus and method.

The embodiments of the present disclosure are also directed to providing an apparatus and method for classifying data capable of classifying data having an ambiguous label, and a system for collecting data using the apparatus and method.

According to an aspect of the present disclosure, there is provided an apparatus for classifying target data including degrees of class membership and vectors, one vector of the vectors comprising at least one attribute value, the apparatus including a clusterer configured to cluster the vectors into at least one cluster, based on the degrees of class membership, in a cluster operation; and a classification model generator configured to label the target data according to a result of the cluster operation, and generate a classification model using the labeled target data.

The apparatus may further include a cluster parameter determiner configured to optimize a cluster parameter value according to a first cluster of the at least one cluster, of the vectors of the target data, wherein the clusterer may re-cluster the vectors of the target data using the optimized cluster parameter value and the degrees of class membership.

The cluster parameter determiner may optimize the cluster parameter value according to the first cluster, based on whether or not a degree of similarity between vectors in the first cluster exceeds a predetermined similarity threshold value, and a distance between the first cluster and a second cluster of the at least one cluster exceeds a predetermined distance threshold value.

The clusterer may re-cluster the vectors of the target data using the following equation:

$$PDF' = PDF \times \text{Degree of Class Membership}^n \quad \text{[Equation]}$$

wherein PDF is a probability density function (PDF), n is a degree of influence of a degree of class membership, and PDF' is a new PDF in which a degree of class membership of a corresponding target data is taken into consideration.

The classification model generator may label the target data according to the result of the cluster operation, by performing binary classification on the target data according to whether or not pieces of target data are included in the at least one cluster.

The apparatus may further include a verifier configured to verify an accuracy of the generated classification model.

The verifier may label a plurality of pieces of test data using values of degrees of class membership of the test data, and calculates the accuracy of the generated classification model by inputting the labeled pieces of test data to the classification model.

When the accuracy of the classification model does not reach a predetermined accuracy threshold value, the clusterer may adjust a degree of influence of the degrees of class membership to re-cluster the vectors of the target data.

The classification model generator may be configured to label the target data in a labeling, wherein the verifier calculates the accuracy of the classification model according to a degree of consistency between a classification result of the test data based on the labeling and a classification result of the test data based on the classification model.

The apparatus may further include a communicator configured to receive input data from a data collector, and transmit a data collection period change signal to the data collector according to a classification result obtained by inputting the received input data to the classification model.

The degrees of class membership may be calculated based on a degree of correlation between the target data and a specific event according to a difference between a generation time point of the target data and an occurrence time point of the specific event.

The degrees of class membership may be calculated using the following equation:

$$f(x) = 1 - \frac{1}{1 + e^{-a(x-b)}} \quad \text{[Equation]}$$

wherein x is a difference between a generation time point of the target data and an occurrence time point of a specific event, and a and b are correction factors.

According to another aspect of the present disclosure, there is provided a method for classifying target data including degrees of class membership and vectors, one vector of the vectors comprising of at least one attribute value, the method including clustering the vectors into at least one cluster, based on the degrees of class membership, in a cluster operation; labeling the target data according to a result of the clustering; and generating a classification model using the labeled target data.

The clustering the vectors may include optimizing a cluster parameter value according to a first cluster of the at least one cluster, of the vectors of the target data; and re-clustering the vectors of the target data using the optimized cluster parameter value and the degrees of class membership.

The optimizing the cluster parameter value may include optimizing the cluster parameter value according to the first cluster, based on whether or not a degree of similarity between vectors in the first cluster exceeds a predetermined similarity threshold value, and a distance between the first cluster and a second cluster of the at least one cluster exceeds a predetermined distance threshold value.

The re-clustering the vectors may include re-clustering the vectors of the target data using the following equation:

$$PDF' = PDF \times \text{Degree of Class Membership}^n \qquad \text{[Equation]}$$

wherein PDF is a probability density function (PDF), n is a degree of influence of a degree of class membership, and PDF' is a new PDF in which a degree of class membership of a corresponding target data is taken into consideration.

The labeling the target data according to a result of the clustering may include labeling the target data by performing binary classification on the target data according to whether or not the respective pieces of target data are included in the at least one cluster.

The method may further include, after the generating the classification model, verifying an accuracy of the generated classification model.

The verifying the accuracy of the classification model may include labeling a plurality of pieces of test data using values of degrees of class membership of the test data; and calculating the accuracy of the generated classification model by inputting the labeled pieces of test data to the classification model.

The method may further include, after the calculating the accuracy of the classification model, when the accuracy of the classification model does not reach target performance, adjusting a degree of influence of the degrees of class membership to re-cluster the vectors of the plurality of pieces of target data.

The calculating the accuracy of the classification model may include calculating the accuracy of the classification model according to a degree of consistency between a classification result of the test data based on the labeling and a classification result of the test data based on the classification model.

The method may further include, after the generating the classification model: receiving input data from a data collector; and transmitting a data collection period change signal to the data collector according to a classification result obtained by inputting the received input data to the classification model.

The degrees of class membership may be calculated based on a degree of correlation between the target data and a specific event according to a difference between a generation time point of the target data and an occurrence time point of the specific event.

The degrees of class membership may be calculated using the following equation:

$$f(x) = 1 - \frac{1}{1 + e^{-a(x-b)}} \qquad \text{[Equation]}$$

wherein x is a difference between a generation time point of the target data and an occurrence time point of a specific event, and a and b are correction factors.

According to another aspect of the present disclosure, there is provided a system for collecting data, including a data classification apparatus configured to classify target data comprising degrees of class membership and vectors, one vector of the vectors comprising at least one attribute value, to cluster the vectors into at least one cluster, based on the degrees of class membership in a cluster operation, and to label the target data according to a result of the cluster operation, and to generate a classification model using labeled target data; and a data collection apparatus configured to collect data at predetermined periods and transmit the collected data to the data classification apparatus, wherein the data collection apparatus changes the data collection period according to a classification result of the collected data based on the classification model.

When the collected data is classified as abnormal, the data collection apparatus may reduce the data collection period.

The degrees of class membership may be calculated based on a degree of correlation between the target data and a specific event according to a difference between a generation time point of the target data and an occurrence time point of the specific event.

The degrees of class membership may be calculated using the following equation:

$$f(x) = 1 - \frac{1}{1 + e^{-a(x-b)}} \qquad \text{[Equation]}$$

wherein x is a difference between a generation time point of the target data and an occurrence time point of a specific event, and a and b are correction factors.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, detailed embodiments of the present disclosure will be described with reference to drawings. However, the embodiments are merely examples and are not to be construed as limiting the present disclosure.

When it is determined that the detailed description of known art related to the present disclosure may obscure the gist of the present disclosure, the detailed description thereof will be omitted. Terminology described below is defined considering functions in the present disclosure and may vary according to a user's or operator's intention or usual practice. Therefore, the definitions of the terminology should be construed based on the contents throughout the specification.

The spirit of the present disclosure is determined by the claims and the following exemplary embodiments are provided to efficiently describe the spirit of the present disclosure to those of ordinary skill in the art.

Figure 1:
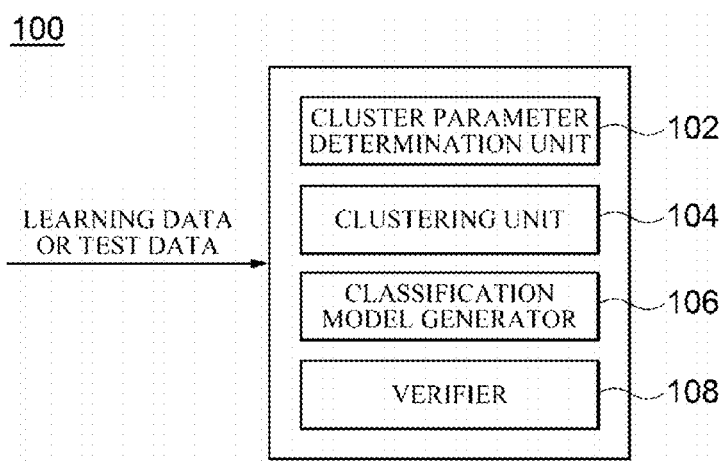
FIG. 1 is a block diagram of an apparatus for classifying data according to an exemplary embodiment of the present disclosure.

FIG. 1 is a block diagram of an apparatus for classifying data according to an exemplary embodiment of the present disclosure.

Referring to FIG. 1, a data classification apparatus 100 includes a cluster parameter determination unit 102, a clustering unit 104, a classification model generator 106, and a verifier 108.

The cluster parameter determination unit 102 determines a cluster parameter value that enables optimization of a clustering result when first clustering is performed on a plurality of input pieces of learning data. In other words, the cluster parameter determination unit 102 serves to optimize a cluster parameter value of a plurality of pieces of learning data. The cluster parameter determination unit 102 may determine a cluster parameter value enabling production of the optimal clustering result that satisfies a previously set condition when the first clustering is performed on the plurality of pieces of learning data. For example, to perform the first clustering on the plurality of pieces of learning data, the cluster parameter determination unit 102 may determine a cluster parameter value enabling production of the optimal clustering result satisfying two conditions that 1) a degree of similarity between pieces of learning data in a cluster exceeds a predetermined similarity threshold value, and 2) a distance between clusters exceeds a predetermined distance threshold value. Here, a cluster parameter that should be optimized for the first clustering of the plurality of pieces of learning data may vary according to respective clustering techniques. The cluster parameter determination unit 102 may select a cluster parameter that should be optimized for the first clustering of the plurality of pieces of learning data according to a clustering technique, and then optimize the value of the selected cluster parameter. Even in the same clustering technique, a value of the optimized cluster parameter may vary according to types and characteristics of pieces of learning data. The cluster parameter determination unit 102 may determine a cluster parameter value resulting in the optimal clustering result by comparing clustering results with each other while changing cluster parameter values for the same learning data. Since selection of a clustering technique, a method of optimizing a cluster parameter according to each clustering technique, an evaluation index of a clustering result, etc. are out of the range of the present disclosure, detailed description thereof will be omitted.

Meanwhile, the learning data includes unique identification information, degrees of class membership, and attribute values. Table 2 shows learning data according to an exemplary embodiment of the present disclosure. Here, state values of a server are shown as examples of learning data, but learning data is not limited thereto.

TABLE 2

| Unique identification information | Degree of class membership | CPU usage rate | CPU run queue | CPU waiting time | Memory usage rate | Memory page-out | Memory usage rate | Swap usage rate | File system usage rate |
| --- | --- | --- | --- | --- | --- | --- | --- | --- | --- |
| FLDBPD01.cvs@20120101-0035 | 27.83 | 74.15 | 19252.68 | 450.1 | 3.7 | 23.15 | 0.0 | 2.35 | 3.45 |
| FLDBPD01.cvs@20120101-0010 | 7.31 | 23.01 | 8012.1 | 1.21 | 1.5 | 941.2 | 3.75 | 97.2 | 40.12 |
| trust-db.cvs@20120927-1915 | 70.1 | 4.38 | 48192.69 | 96.8 | 98.24 | 8434.5 | 0.0 | 99.9 | 90.53 |

Here, the unique identification information denotes information which allows the corresponding piece of learning data from other pieces of learning data. The degree of class membership represents a degree of correlation between the corresponding piece of learning data and a specific event. For example, the degree of class membership may represent a degree of correlation between the corresponding piece of learning data and a server fault. The attribute values represent values of respective attributes included in the learning data. For example, the attribute values may be values obtained by measuring a performance value, an operation value, and surroundings (temperature, humidity, pressure, etc.) of the corresponding server at a predetermined time. However, the attribute values are not limited to them, and may be various kinds of values according to attributes included in the learning data. In Table 1 above, attribute values include a central processing unit (CPU) usage rate, a CPU run queue, a CPU waiting time, a memory usage rate, a memory page-out, a memory usage (e.g., the usage of an actually used area excluding a file cache), a swap usage, a file system usage rate, and so on. The learning data includes at least one attribute value, and a set of respective attribute values may be represented by a vector. The cluster parameter determination unit 102 determines a cluster parameter value that produces the optimal clustering result when first clustering is performed on respective vectors of the plurality of pieces of learning data.

When a piece of learning data without degree of class membership is input to the cluster parameter determination unit 102, the data classification apparatus 100 may calculate a degree of correlation dependent on a difference between a generation time point of the piece of learning data and an occurrence time point of a specific event as a degree of class membership of the piece of learning data. In other words, according to the time when the specific event has occurred after generation of the piece of learning data, it is possible to calculate the degree of correlation between the piece of learning data and the specific event (the degree of class membership). The specific event may include various types of events relating to server fault or server failure, for example, software error, operating system error, hardware damage, or server rebooting. To calculate a degree of class membership of a predetermined piece of learning data, the data classification apparatus 100 may use a logistic function such as Equation 1 given below.

$$f(x) = 1 - \frac{1}{1 + e^{-a(x-b)}}$$ [Equation 1]

Here x denotes a difference between a generation time point of the piece of learning data and an occurrence time point of a specific event, and a and b denote correction factors set according to a characteristic of the piece of learning data.

Figure 2:
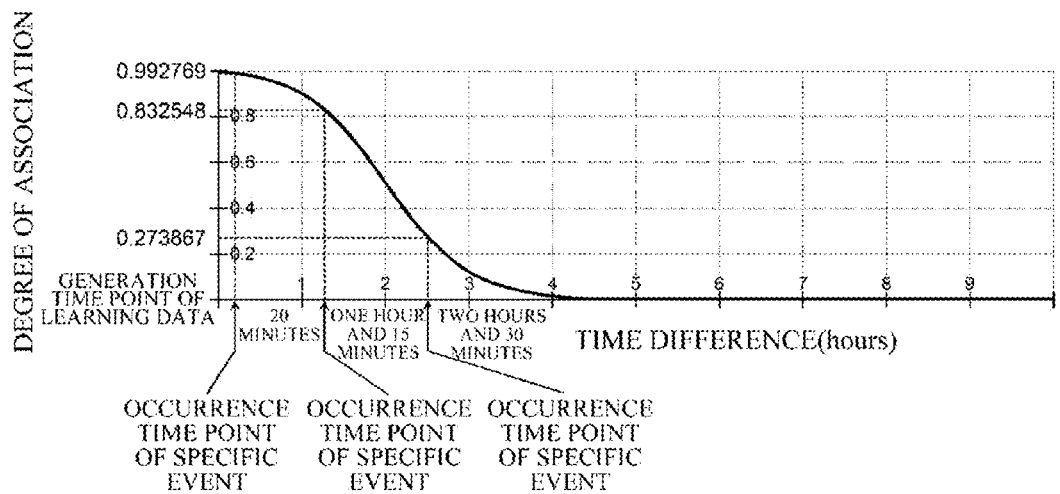
FIG. 2 is a graph of a function for a degree of class membership when a and b are set to 2 in Equation 1.

FIG. 2 is a graph of a function f(x) for a degree of class membership when a and b are set to 2 in Equation 1. Referring to FIG. 2, when a server fault (i.e., a specific event) occurs 20 minutes after generation of a piece of learning data, a degree of class membership of the piece of learning data is 0.992769. When a server fault occurs one hour and 15 minutes after generation the piece of learning data, a degree of class membership of the piece of learning data is 0.832548. When a server fault occurs two hours and 30 minutes after generation the piece of learning data, a degree of class membership of the piece of learning data is 0.273867. In FIG. 2, it is possible to see that a degree of class membership of the corresponding piece of learning data decreases with an increase in a difference between the generation time point of the piece of learning data and a time point at which a server fault occurs. In this way, using the function f(x) for the degree of class membership, it is possible to calculate a degree of class membership of the corresponding piece of learning data.

The clustering unit 104 performs second clustering (re-clustering) on the plurality of pieces of learning data using the cluster parameter value determined by the cluster parameter determination unit 102. The clustering unit 104 clusters pieces of learning data similar to each other together using a clustering technique, for example, k-means clustering, Dirichlet clustering, or so on. However, the clustering technique is not limited to them, and the clustering unit 104 may use various clustering techniques other than them. The clustering unit 104 may re-cluster the plurality of pieces of learning data (i.e., the respective vectors of the plurality of pieces of learning data) using the determined cluster parameter value in view of the degrees of class membership included in the respective pieces of learning data.

In other words, in a general clustering technique, a probability density function (PDF) set for the clustering technique is used to determine whether or not each piece of learning data is included in a specific cluster. On the other hand, the clustering unit 104 causes a PDF to reflect the degree of class membership of each piece of learning data, thus determining whether or not the piece of learning data is included in a specific cluster. Specifically, the clustering unit 104 may re-cluster the plurality of pieces of learning data using a cluster function of Equation 2 below.

$$PDF' = PDF \times \text{Degree of Class Membership}^n$$ [Equation 2]

Here PDF is a PDF of the corresponding clustering technique, and n is a degree of influence of a degree of class membership. In other words, in the case of n>1, the influence of the degree of class membership becomes relatively large, and in the case of n<1, the influence of the degree of class membership becomes relatively small. An influence degree n of degrees of class membership may be determined according to how much the degrees of class membership will be taken into consideration to re-cluster the plurality of pieces of learning data (i.e., how much weight will be given). PDF' is a new PDF in which a degree of class membership of the corresponding piece of learning data is taken into consideration.

For example, when the clustering unit 104 re-clusters the plurality of pieces of learning data using k-means clustering, the clustering unit 104 may use a cluster function of Equation 3 below.

$$PDF' = PDF \times \text{Degree of Class Membership}^n = \frac{\text{Degree of Class Membership}^n}{1 + dist}$$ [Equation 3]

Here, dist is a distance between the center of the corresponding cluster and the corresponding piece of learning data. A center of a given cluster may be an average of vectors which are included in the given cluster, and the distance may be a Euclidean distance between the center and the data.

According to Equation 3, 1) a piece of learning data whose degree of class membership is high and whose distance from the center of the corresponding cluster is short belongs to the cluster. 2) A piece of learning data whose degree of class membership is high but whose distance from the center of the corresponding cluster is long (i.e., which has low representativeness of the cluster) does not belong to the cluster. Even when the representativeness of the cluster is low, if the degree of class membership is high enough, the piece of learning data may belong to the cluster. 3) When a degree of class membership is about halfway or less, it may be determined whether or not the corresponding piece of learning data belongs to a cluster based on a distance from the center of the cluster. In other words, even when the degree of class membership is not so high, the corresponding piece of data having a short distance from the center of a cluster may belong to the cluster.

FIG. 3 is diagrams showing clustering results of a case in which degrees of class membership have been taken into consideration and a case in which degrees of class membership have not been taken into consideration. In these cases, k-means clustering has been performed. Points shown in FIG. 3 denote pieces of learning data projected onto a two-dimensional (2D) Euclidian plane. The degree of darkness of a point denotes a degree of class membership. The darker a point, the higher a degree of class membership is.

Figure 3A:
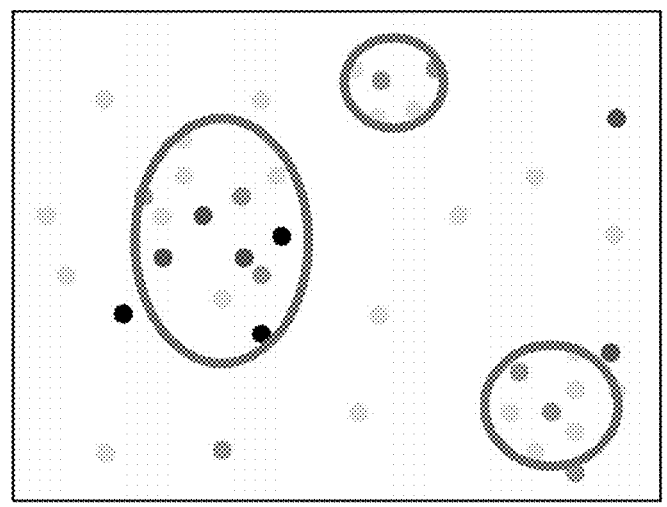
FIGS. 3A and 3B are diagrams showing clustering results of a case in which degrees of class membership have been taken into consideration and a case in which degrees of class membership have not been taken into consideration.

Referring to FIG. 3A, it is possible to see that, when degrees of class membership have not been taken into consideration, there are three clusters according to the degree of concentration of pieces of learning data. Only according to only a distance between the center of a cluster and each piece of learning data, it is determined whether or not the piece of learning data is included in the cluster.

Figure 3B:
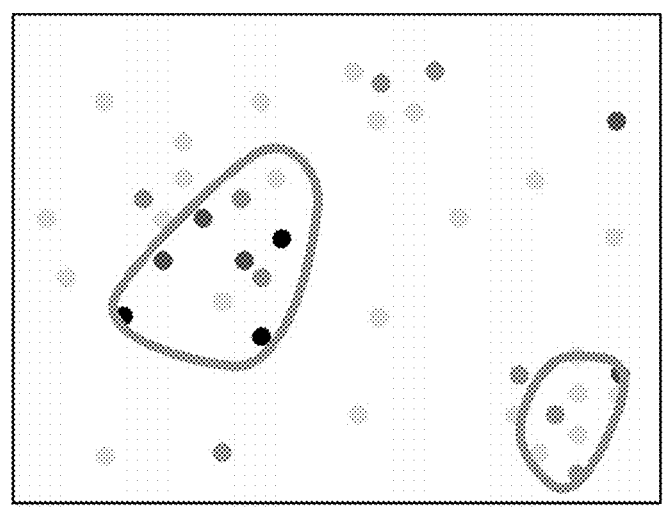

Referring to FIG. 3B, it is possible to see that, when degrees of class membership have been taken into consideration, the number of clusters is reduced to two, and the clustering result also varies in comparison with FIG. 3A. When clustering is performed in view of the degrees of class membership, a cluster to which pieces of learning data having low degrees of class membership belong in FIG. 3A disappears, and it also varies whether or not each piece of learning data is included in a still remaining cluster according to a degree of class membership.

The classification model generator 106 labels the plurality of pieces of learning data according to a result of reclustering the pieces of learning data, and generates a classification model using the labeled pieces of learning data. According to the re-clustering result, the classification model generator 106 may label the pieces of learning data according to two kinds of classification (i.e., binary classification). For example, according to the re-clustering result, the classification model generator 106 may label a piece of learning data belonging to a predetermined cluster as abnormal (A), and a piece of learning data belonging to no cluster as normal (N). The classification model generator 106 may generate a classification model using the pieces of learning data labeled through binary classification as input data. The classification model generator 106 may generate a classification model using a classification technique, for example, naive Bayesian, random forest, support vector machine (SVM), or so on. However, the classification technique is not limited to them, and it is possible to use various classification techniques other than them.

The verifier 108 may verify the accuracy of the classification model generated by the classification model generator 106. At this time, the verifier 108 may verify the accuracy of the classification model using test data of the same form as the learning data. The test data includes unique identification information, degrees of class membership, and attribute values like the learning data. Specifically, the verifier 108 may label each piece of the test data using the values of the degrees of class membership included in the input test data. At this time, the verifier 108 may classify the corresponding piece of test data as abnormal (A) when a degree of class membership is a previously set value or more, and as normal (N) when the degree of class membership is less than the previously set value. Then, the verifier 108 may input the labeled test data to the classification model generated by the classification model generator 106, check a classification result, and calculate the accuracy of the classification model.

TABLE 3

|  | Labeled N | Labeled A |
|---|---|---|
| Classification N | 2,300,319 | 280,211 |
| Classification A | 4,606 | 3,809 |

Table 3 shows an example for verifying the accuracy of the classification model generated by the classification model generator 106. Referring to Table 3, a total of 2,588,945 pieces of test data were used. Here, as a result of inputting 2,304,925 pieces of test data labeled as normal (N) to the classification model, 2,300,319 pieces of the test data were classified as normal (N), and 4,606 pieces of the test data were classified as abnormal (A). As a result of inputting 284,020 pieces of the test data labeled as abnormal (A) to the classification model, 280,211 pieces of the test data were classified as normal (N), and 3,809 pieces of the test data were classified as abnormal (A). From the classification results shown in Table 3, the accuracy and error rate of the classification model are calculated as follows:

$$\text{Accuracy} = \frac{\text{Number of accurately prediected pieces of data}}{\text{Total number of data}}$$
$$= \frac{2,300,319 + 3,809}{2,300,319 + 280,211 + 4,606 + 3,809}$$
$$= 89.0\%$$

$$\text{Error rate} = \frac{\text{Number of inaccurately prediected pieces of data}}{\text{Total number of data}}$$
$$= \frac{280,211 + 4,606}{2,300,319 + 280,211 + 4,606 + 3,809}$$
$$= 11.0\%$$

Meanwhile, when input data is received from a data collector (not shown) which collects data at predetermined collection periods, the data classification apparatus 100 may transmit a data collection period change signal to the data collector (not shown) according to a classification result obtained by inputting the received input data to the classification model. For example, when the input data received from the data collector (not shown) is input to the classification model and classified as abnormal, the data classification apparatus 100 may transmit a data collection period change signal instructing to reduce the data collection period to the data collector (not shown).

In exemplary embodiments of the present disclosure, learning data is clustered in view of degrees of class membership included in the learning data and labeled according to a result of the clustering, and a classification model is generated using the labeled learning data as input data. Thus, performance in classifying data may be improved even with learning data having degrees of class membership of low reliability. In addition, since input pieces of data are labeled according to a result of clustering and then classified, it is even possible to effectively classify data with an ambiguous label. Furthermore, when the accuracy of the classification model does not reach a target value, it is possible to optimize performance of the classification model by adjusting a degree of influence of degrees of class membership.

COMPARATIVE EXAMPLE (1) Control group: Learning data that had not been subjected to a clustering process was directly input to a classifier so that a classification model was generated.

(2) Experimental group: Learning data that had been subjected to a clustering process in view of degrees of class membership was input to the classifier so that a classification model was generated.

(3) Experimental environment: Analysis package—mahout v0.7, clustering algorithm—k-means clustering (clustering parameter: T1=0.8, T2=0.24, Convergennce=0.84, Max Iteration=30), and classifier algorithm—naive Bayes classifier (4) Constitution of data: As server performance data monitored at specific time periods, 6,378,481 pieces of learning data and 2,588,945 pieces of test data were used.

(5) Experiment results
1) In case of control group

TABLE 4

|  | Labeled N | Labeled A |
|---|---|---|
| Classification N | 2,183,555 | 396,975 |
| Classification A | 3,735 | 4,680 |

$$\text{Accuracy} = \frac{2,183,555 + 4,680}{2,13,555 + 4,680 + 3,735 + 4,680} = 84.5\%$$

2) In case of experimental group

TABLE 5

|  | Labeled N | Labeled A |
|---|---|---|
| Classification N | 2,402,863 | 177,667 |
| Classification A | 5,511 | 2,904 |

$$\text{Accuracy} = \frac{2{,}402{,}863 + 2{,}904}{2{,}402{,}863 + 177{,}667 + 5{,}511 + 2{,}904} = 92.9\%$$

As seen above, when a classification model was generated by directly inputting the learning data to the classifier without a clustering process, the accuracy was 84.5%, and when a classification model was generated by inputting the learning data which had been subjected to a clustering process in view of degrees of class membership to the classifier, the accuracy was 92.9%. In other words, the accuracy of the experimental group was improved by about 10% compared to that of the control group. This is because the clustering process in which degrees of class membership are taken into consideration contributed to the improvement of performance in classifying the learning data having the degrees of class membership of low reliability.

Figure 4:
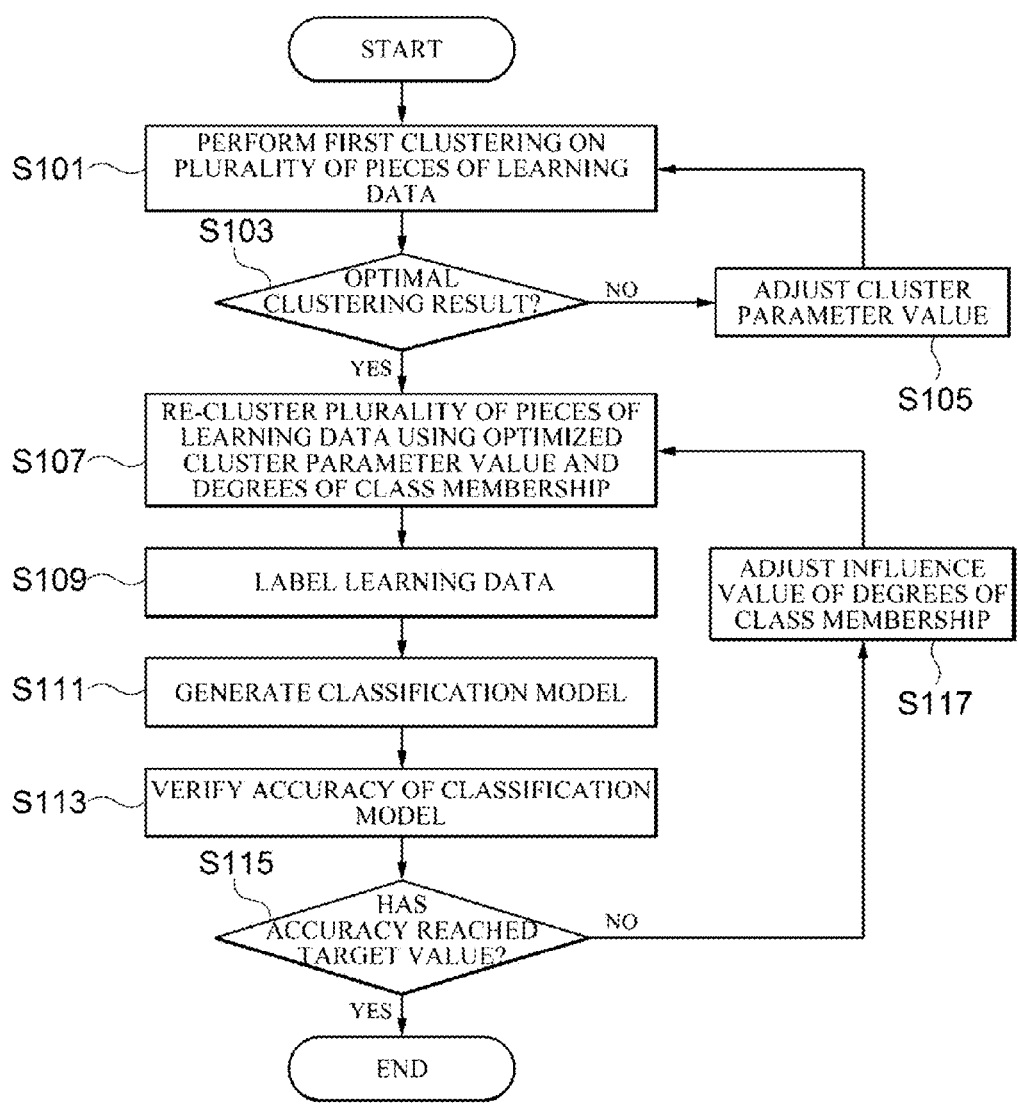
FIG. 4 is a flowchart illustrating a method for classifying data according to an exemplary embodiment of the present disclosure.

FIG. 4 is a flowchart illustrating a method for classifying data according to an exemplary embodiment of the present disclosure.

Referring to FIG. 4, the data classification apparatus 100 performs first clustering on a plurality of input pieces of learning data (S101). For example, the data classification apparatus 100 may perform first clustering on vectors of pieces of learning data similar to each other using a clustering technique, such as, k-means clustering, Dirichlet clustering, or so on. The data classification apparatus 100 may select a cluster parameter according to the clustering technique, and perform first clustering on respective vectors of the plurality of pieces of learning data using a predetermined cluster parameter value.

Next, the data classification apparatus 100 examines whether a clustering result of the first clustering is optimal (S103). The data classification apparatus 100 may examine whether the clustering result of the first clustering is optimal according to whether a previously set condition is satisfied. For example, when the data classification apparatus 100 performs first clustering on the plurality of pieces of learning data using k-means clustering, it is possible to examine whether the clustering result is optimal according to whether or not two conditions that 1) a degree of similarity between pieces of learning data in a cluster exceeds a previously set value, and 2) a distance between clusters exceeds a previously set value are satisfied.

When it is examined in step 103 that the clustering result of the first clustering is not optimal, the data classification apparatus 100 adjusts the cluster parameter value and performs first clustering again (S105). The data classification apparatus 100 examines again whether or not a clustering result according to the adjustment of the cluster parameter value is optimal, and repeats this process until the optimal clustering result is obtained.

When it is examined in step 103 that the clustering result of the first clustering is optimal, the data classification apparatus 100 re-clusters the vectors of the plurality of pieces of learning data using the cluster parameter value producing the optimal clustering result and degrees of class membership of the respective pieces of learning data (S107).

The data classification apparatus 100 may re-cluster the respective vectors of the plurality of pieces of learning data using Equation 2 above.

Next, the data classification apparatus 100 labels the plurality of pieces of learning data according to a re-clustering result (S109). For example, according to the re-clustering result, the data classification apparatus 100 may label a piece of learning data belonging to a predetermined cluster as abnormal (A) and a piece of learning data belonging to no cluster as normal (N).

Next, the data classification apparatus 100 generates a classification model using the labeled pieces of learning data as input data (S111). The data classification apparatus 100 may generate the classification model using a classification technique, for example, naive Bayesian, random forest, SVM, or so on. However, the classification technique is not limited to them, and it is possible to use various classification techniques other than them.

Next, the data classification apparatus 100 verifies the accuracy of the classification model (S113). The data classification apparatus 100 may label respective pieces of input test data using values of degrees of class membership included in the test data, input the labeled test data to the classification model, and then examine a classification result, thereby verifying the accuracy of the classification model.

Next, the data classification apparatus 100 checks whether the accuracy of the classification model reaches a target value (S115). When it is checked in step 115 that the accuracy of the classification model does not reach the target value, the data classification apparatus 100 adjusts an influence value of the degrees of class membership and re-clusters the respective vectors of the plurality of pieces of learning data (S117). In other words, when the accuracy of the classification model does not reach the target value, the data classification apparatus 100 may adjust a value of the influence degree n of degrees of class membership in Equation 2 to re-cluster the respective vectors of the plurality of pieces of learning data. After that, the data classification apparatus 100 labels the plurality of pieces of learning data according to a re-clustering result, generates a classification model again using the labeled pieces of learning data, and repeats this process until the accuracy of the re-generated classification model reaches the target value.

Figure 5:
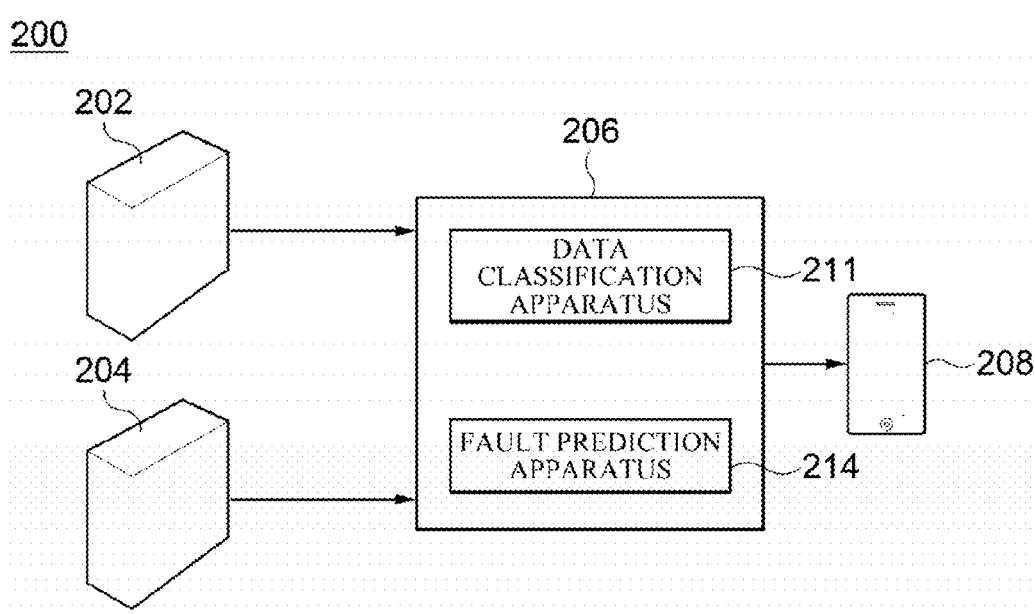
FIG. 5 is a diagram illustrating a fault prediction system employing a data classification apparatus according to an exemplary embodiment of the present disclosure.

FIG. 5 is a diagram illustrating a fault prediction system employing a data classification apparatus according to an exemplary embodiment of the present disclosure.

Referring to FIG. 5, a fault prediction system 200 includes a learning server 202, a target server 204, a fault prediction server 206, and an administrator terminal 208.

The learning server 202 performs an operation (or function) that is the same as or similar to operation of the target server 204. The learning server 202 may be a server of the same type as the target server 204. The learning server 202 transmits data obtained by measuring performance, an operational value, surroundings, etc. of the learning server 202 to the fault prediction server 206. The pieces of data transmitted by the learning server 202 may be classified as learning data and test data and used in the fault prediction server 206.

The target server 204 is a server that is a target for which the fault prediction system 200 predicts whether or not there is a fault. The target server 204 transmits data obtained by measuring performance, an operational value, surroundings, etc. of the target server 204 to the fault prediction server 206.

The target server 204 may transmit the measured data to the fault prediction server 206 in real time (or periodically).

The fault prediction server 206 includes a data classification apparatus 211 and a fault prediction apparatus 214. The data classification apparatus 211 may label the pieces of data received from the learning server 202 with degrees of association (i.e., degrees of class membership) with a fault, and then classify the pieces of data as pieces of learning data and test data. The data classification apparatus 211 may cluster the pieces of learning data in view of degrees of association between the pieces of learning data and a fault, label the pieces of learning data according to a clustering result, and generate a classification model using the labeled pieces of learning data as input data. The data classification apparatus 211 may verify performance of the classification model using the test data. A constitution and operation of the data classification apparatus 211 have been described above, and detailed description thereof will be omitted. When data is received from the target server 204, the fault prediction apparatus 214 inputs the data to the classification model, thereby predicting a fault of the target server 204. When the probability of a fault occurring exceeds a previously set threshold value, the fault prediction apparatus 214 may notify the administrator terminal 208 of the probability of a fault occurring. Here, the threshold value for the probability of a fault occurring may be determined according to performance of the classification model. The fault prediction apparatus 214 may transmit a data collection period change signal to the target server 204 according to a classification result obtained by inputting the data received from the target server 204 to the classification model. For example, when the data received from the target server 204 is input to the classification model and classified as abnormal, the fault prediction apparatus 214 may transmit a data collection period change signal instructing to reduce a data collection period to the target server 204. Here, the data classification apparatus 211 and the fault prediction apparatus 214 are shown to be separately implemented. However, implementation of the data classification apparatus 211 and the fault prediction apparatus 214 is not limited to this, and the data classification apparatus 211 and the fault prediction apparatus 214 may be implemented in one body.

When the administrator terminal 208 is notified of the probability of a fault occurring in the target server 204 by the fault prediction server 206, the administrator terminal 208 may warn an administrator with an alarm or warning light.

Meanwhile, exemplary embodiments of the present disclosure may include a computer-readable recording medium including a program for performing the methods described herein on a computer. The computer-readable recording medium may separately include program commands, local data files, local data structures, etc. or include a combination of them. The medium may be specially designed and configured for the present disclosure, or known and available to those of ordinary skill in the field of computer software. Examples of the computer-readable recording medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers.

In exemplary embodiments of the present disclosure, learning data is clustered in view of degrees of class membership included in the learning data and labeled according to a result of the clustering, and a classification model is generated using the labeled learning data as input data. Thus, performance in classifying data can be improved even with learning data having degrees of class membership of low reliability. In addition, since input pieces of data are labeled according to a result of clustering and then classified, it is possible to effectively classify even data with an ambiguous label. Furthermore, when the accuracy of the classification model does not reach a target value, it is possible to optimize performance of the classification model by adjusting a degree of influence of degrees of class membership.

It will be apparent to those skilled in the art that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. An apparatus for classifying target data comprising degrees of class membership and vectors, one vector of the vectors comprising at least one attribute value, the apparatus comprising:
   a clusterer configured to cluster the vectors into at least one cluster, based on the degrees of class membership, in a cluster operation, the degrees of class membership comprising a degree of correlation between the target data and a specific event; and
   a classification model generator configured to label the target data according to a result of the cluster operation, and generate a classification model using the labeled target data; and
   a cluster parameter determiner configured to optimize a cluster parameter value according to a first cluster of the at least one cluster, of the vector of the target data,
   wherein the clusterer re-clusters the vectors of the target data using the optimized cluster parameter value and probability density function(PDF) in which a degree of class membership of a corresponding target data is taken into consideration.

2. The apparatus of claim 1, wherein the cluster parameter determiner optimizes the cluster parameter value according to the first cluster, based on whether or not a degree of similarity between vectors in the first cluster exceeds a predetermined similarity threshold value, and a distance between the first cluster and a second cluster of the at least one cluster exceeds a predetermined distance threshold value.

3. The apparatus of claim 1, wherein the clusterer re-clusters the vectors of the target data using the following equation:

$$PDF' = PDF \times \text{Degree of Class Membership}^n \quad \text{[Equation]}$$

wherein PDF is a probability density function (PDF), n is a degree of influence of a degree of class membership, and PDF' is a new PDF in which a degree of class membership of a corresponding target data is taken into consideration.

4. The apparatus of claim 1, wherein the classification model generator labels the target data according to the result of the cluster operation, by performing binary classification on the target data according to whether or not pieces of target data are included in the at least one cluster.

5. The apparatus of claim 1, further comprising a verifier configured to verify an accuracy of the generated classification model.

6. The apparatus of claim 5, wherein the verifier labels a plurality of pieces of test data using values of degrees of class membership of the test data, and calculates the accuracy of the generated classification model by inputting the labeled pieces of test data to the classification model.

7. The apparatus of claim 6, wherein, when the accuracy of the classification model does not reach a predetermined accuracy threshold value, the clusterer adjusts a degree of influence of the degrees of class membership to re-cluster the vectors of the target data.

8. The apparatus of claim 6, wherein the classification model generator is configured to label the target data in a labeling, wherein the verifier calculates the accuracy of the classification model according to a degree of consistency between a classification result of the test data based on the labeling and a classification result of the test data based on the classification model.

9. The apparatus of claim 1, further comprising a communicator configured to receive input data from a data collector, and transmit a data collection period change signal to the data collector according to a classification result obtained by inputting the received input data to the classification model.

10. The apparatus of claim 1, wherein the degree of correlation between the target data and the specific event is calculated based on a difference between a generation time point of the target data and an occurrence time point of the specific event.

11. The apparatus of claim 1, wherein the degrees of class membership are calculated using the following equation:

$$f(x) = 1 - \frac{1}{1 + e^{-a(x-b)}} \qquad \text{[Equation]}$$

wherein x is a difference between a generation time point of the target data and an occurrence time point of the specific event, and a and b are correction factors.

12. The apparatus of claim 1, wherein the clusterer re-clusters the vectors based on at least a degree of class membership of a corresponding target data.

13. The apparatus of claim 1, wherein the degrees of class membership are calculated based on at least a generation time point of the target data.

14. A method for classifying target data comprising degrees of class membership and vectors, one vector of the vectors comprising of at least one attribute value, the method comprising:
  clustering the vectors into at least one cluster, based on the degrees of class membership, in a cluster operation, the degrees of class membership comprising a degree of correlation between the target data and a specific event;
  labeling the target data according to a result of the clustering;
  generating a classification model using the labeled target data;
  optimizing a cluster parameter value according to a first cluster of the at least one cluster, of the vectors of the target data; and
  re-clustering the vectors of the target data using the optimized cluster parameter value and probability density function(PDF) in which a degree of class membership of a corresponding target data is taken into consideration.

15. The method of claim 14, wherein the optimizing the cluster parameter value comprises optimizing the cluster parameter value according to the first cluster, based on whether or not a degree of similarity between vectors in the first cluster exceeds a predetermined similarity threshold value, and a distance between the first cluster and a second cluster of the at least one cluster exceeds a predetermined distance threshold value.

16. The method of claim 14, wherein the re-clustering the vectors comprises re-clustering the vectors of the target data using the following equation:

$$PDF' = PDF \times \text{Degree of Class Membership}^n \qquad \text{[Equation]}$$

wherein PDF is a probability density function (PDF), n is a degree of influence of a degree of class membership, and PDF' is a new PDF in which a degree of class membership of a corresponding target data is taken into consideration.

17. The method of claim 14, wherein the labeling the target data according to a result of the clustering comprises labeling the target data by performing binary classification on the target data according to whether or not the respective pieces of target data are included in the at least one cluster.

18. The method of claim 14, further comprising, after the generating the classification model, verifying an accuracy of the generated classification model.

19. The method of claim 18, wherein the verifying the accuracy of the classification model comprises:
  labeling a plurality of pieces of test data using values of degrees of class membership of the test data; and
  calculating the accuracy of the generated classification model by inputting the labeled pieces of test data to the classification model.

20. The method of claim 19, further comprising, after the calculating the accuracy of the classification model, when the accuracy of the classification model does not reach target performance, adjusting a degree of influence of the degrees of class membership to re-cluster the vectors of the plurality of pieces of target data.

21. The method of claim 19, wherein the calculating the accuracy of the classification model comprises calculating the accuracy of the classification model according to a degree of consistency between a classification result of the test data based on the labeling and a classification result of the test data based on the classification model.

22. The method of claim 14, further comprising, after the generating the classification model:
  receiving input data from a data collector; and
  transmitting a data collection period change signal to the data collector according to a classification result obtained by inputting the received input data to the classification model.

23. The method of claim 14, wherein the degree of correlation between the target data and the specific event is calculated based on a difference between a generation time point of the target data and an occurrence time point of the specific event.

24. The method of claim 14, wherein the degrees of class membership are calculated using the following equation:

$$f(x) = 1 - \frac{1}{1 + e^{-a(x-b)}} \qquad \text{[Equation]}$$

wherein x is a difference between a generation time point of the target data and an occurrence time point of the specific event, and a and b are correction factors.

25. A system for collecting data, comprising:
a data classification apparatus configured to classify target data comprising degrees of class membership and vectors, one vector of the vectors comprising at least one attribute value, to cluster the vectors into at least one cluster, based on the degrees of class membership in a cluster operation, the degrees of class membership comprising a degree of correlation between the target data and a specific event, and to label the target data according to a result of the cluster operation, and to generate a classification model using labeled target data; and
a data collection apparatus configured to collect data at predetermined periods and transmit the collected data to the data classification apparatus,
wherein the data collection apparatus changes the data collection period according to a classification result of the collected data based on the classification model,
wherein the data classification apparatus configured to optimize a cluster parameter value according to a first cluster of the at least one cluster, of the vector of the target data, and re-clusters the vectors of the target data using the optimized cluster parameter value and probability density function(PDF) in which a degree of class membership of a corresponding target data is taken into consideration.

26. The system of claim 25, wherein, when the collected data is classified as abnormal, the data collection apparatus reduces the data collection period.

27. The system of claim 25, wherein the degree of correlation between the target data and the specific event is calculated based on a difference between a generation time point of the target data and an occurrence time point of the specific event.

28. The system of claim 25, wherein the degrees of class membership are calculated using the following equation:

$$f(x) = 1 - \frac{1}{1 + e^{-a(x-b)}} \quad \text{[Equation]}$$

wherein x is a difference between a generation time point of the target data and an occurrence time point of the specific event, and a and b are correction factors.

* * * * *